United States Patent
Kim et al.

(10) Patent No.: US 8,053,144 B2
(45) Date of Patent: Nov. 8, 2011

(54) MEMBRANE-ELECTRODE ASSEMBLY FOR FUEL CELL AND FUEL CELL COMPRISING THE SAME

(75) Inventors: Hee-Tak Kim, Suwon-si (KR); Myoung-Ki Min, Suwon-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 1087 days.

(21) Appl. No.: 11/126,923

(22) Filed: May 11, 2005

(65) Prior Publication Data
US 2005/0287419 A1 Dec. 29, 2005

(30) Foreign Application Priority Data
Jun. 29, 2004 (KR) .................. 10-2004-0049418

(51) Int. Cl.
*H01M 8/10* (2006.01)
*H01M 4/86* (2006.01)

(52) U.S. Cl. ........................ 429/530; 429/483

(58) Field of Classification Search .......................... None
See application file for complete search history.

(56) References Cited

U.S. PATENT DOCUMENTS

| | | | | |
|---|---|---|---|---|
| 5,294,232 A | * | 3/1994 | Sakairi et al. | 29/623.5 |
| 6,030,718 A | * | 2/2000 | Fuglevand et al. | 429/26 |
| 6,492,295 B2 | * | 12/2002 | Hitomi et al. | 502/159 |
| 6,680,138 B1 | * | 1/2004 | Honma et al. | 429/492 |
| 2003/0118886 A1 | * | 6/2003 | Morishima et al. | 429/33 |
| 2003/0235738 A1 | | 12/2003 | Zheng | |
| 2004/0157131 A1 | * | 8/2004 | Fan et al. | 429/317 |
| 2005/0053817 A1 | * | 3/2005 | Blank et al. | 429/30 |
| 2006/0057281 A1 | | 3/2006 | Izumi et al. | |

FOREIGN PATENT DOCUMENTS

| | | |
|---|---|---|
| CN | 1464580 A | 12/2003 |
| JP | 05-047405 | 2/1993 |
| JP | 08-115726 | 5/1996 |
| JP | 2001-158806 | 6/2001 |
| JP | 2003-282074 | 10/2003 |
| WO | WO 00/22684 * | 4/2000 |
| WO | WO 2004/012291 A1 | 2/2004 |
| WO | WO 2004/038886 A2 | 5/2004 |

OTHER PUBLICATIONS

"409529 Poly(ethylene glycol) methacrylate," Sigma-Aldrich Catalog [online] <URL: http://sigmaaldrich.com>, retrieved on May 21, 2010.*

* cited by examiner

*Primary Examiner* — Jonathan Crepeau
(74) *Attorney, Agent, or Firm* — Christie, Parker & Hale, LLP

(57) ABSTRACT

Disclosed is a membrane-electrode assembly for a fuel cell including an anode and a cathode with a polymer electrolyte membrane placed between them. At least one of the anode and the cathode includes a catalyst layer including a catalyst metal with a hydrophilic polymer layer on the catalyst metal.

14 Claims, 3 Drawing Sheets

MEMBRANE-ELECTRODE ASSEMBLY FOR FUEL CELL AND FUEL CELL COMPRISING THE SAME

CROSS REFERENCE TO RELATED APPLICATION

This application claims priority to and the benefit of Korean Patent Application No. 10-2004-0049418, filed on Jun. 29, 2004 in the Korean Intellectual Property Office, the entire content of which is incorporated herein by reference.

FIELD OF THE INVENTION

The present invention relates to a membrane-electrode assembly for a fuel cell and a fuel cell comprising the same, and more particularly, to a membrane-electrode assembly for a fuel cell which is capable of providing a fuel cell exhibiting improved cycle life characteristics and a fuel cell comprising the same.

BACKGROUND OF THE INVENTION

A fuel cell is a power generation system that converts chemical energy obtained from a reaction between oxygen and hydrogen in a hydrocarbon-based material such as methanol, ethanol, or natural gas, to electrical energy.

A fuel cell can be classified as a phosphoric acid type, a molten carbonate type, a solid oxide type, a polymer electrolyte type, or an alkaline type of fuel cell depending upon the kind of electrolyte used. Although each fuel cell operates in accordance with the same basic principles, the kind of fuel, the operating temperature, the catalyst, and the electrolyte are all dependent on the type of cell selected.

Recently, a polymer electrolyte membrane fuel cell (PEMFC), which has power characteristics superior to those of other fuel cells, an operating temperature that is lower, and starting and response characteristics that are quicker, has been developed. It has advantages in that it can be applied to a wide array of fields, such as a transportable electrical source for an automobile, for distributed power such as for houses and public buildings, and as a small electrical source for electronic devices.

SUMMARY OF THE INVENTION

In one embodiment of the present invention, a membrane-electrode assembly is provided for a fuel cell exhibiting improved cycle life characteristics.

In another embodiment of the present invention, a fuel cell is provided including the membrane-electrode assembly.

According to an embodiment of the present invention, a membrane-electrode assembly is provided for a fuel cell including an anode and a cathode placed opposing each other; a polymer electrolyte membrane placed between them. According to this embodiment, at least one of the anode and the cathode includes a catalyst layer, the catalyst layer including a catalyst metal; and a hydrophilic polymer layer formed on the surface of the catalyst metal.

The present invention also provides a fuel cell including: at least one membrane-electrode assembly which includes an anode and a cathode; a polymer electrolyte membrane placed between the anode and the cathode; and a separator having a flow channel for supplying gas and contacting either of the anode or the cathode, wherein at least one of the anode and the cathode includes a catalyst layer including a catalyst metal and a hydrophilic polymer layer formed on the surface of the catalyst metal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION

In the following detailed description, certain embodiments of the invention are shown and described. As will be realized, the invention is capable of modification in various respects, all without departing from the invention. Accordingly, the drawings and description are to be regarded as illustrative in nature, and not restrictive.

The present invention relates to a membrane-electrode assembly including a catalyst which is capable of improving cycle life characteristics of fuel cells.

Figure 2:
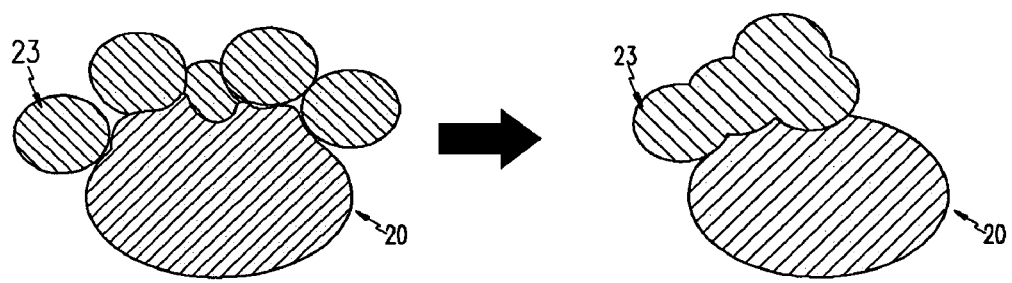
FIG. 2 is a schematic view illustrating a coagulation phenomenon of a catalyst according to a prior art fuel cell.

Noble metals such as platinum, supported by a carrier, are generally used as a catalyst for a fuel cell. Since catalytic activity is proportional to the specific surface area of the catalyst, several studies have been performed to increase the specific surface area of a catalyst by making the particle size of the catalyst nano-size. However, as shown in FIG. 2, as fuel reduction and oxidant oxidation reactions of the fuel cell are repeated, the specific surface area of the catalyst 23 decreases due to agglomeration of the nano-sized metal catalyst particles 23 supported by the carrier 20. Consequently, the cycle life of the fuel cell is decreased. In a typical fuel cell, the fuel is hydrogen and the oxidant is either oxygen or air.

Figure 1:
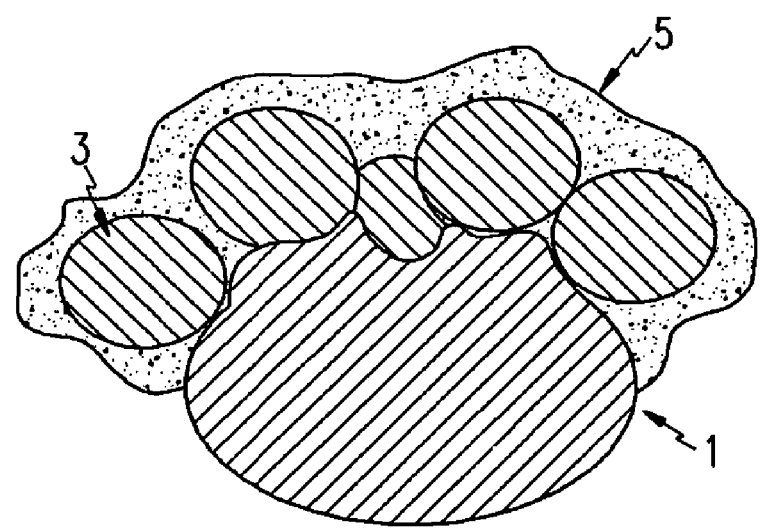
FIG. 1 is a schematic view illustrating a catalyst used in a membrane-electrode assembly according to the present invention.

According to an embodiment of the present invention, agglomeration of the catalyst is prevented by using a polymer with excellent moisture-absorption properties in preparing the catalyst. According to an embodiment of the present invention, a metal catalyst is provided that is supported by a carrier and includes a hydrophilic polymer layer surrounding the metal catalyst. The structure of the catalyst is shown schematically in FIG. 1. A carrier 1 is provided, with particles 3 of the metal catalyst supported by the carrier 1. The particles 3 of the metal catalyst are surrounded by a hydrophilic polymer layer 5.

The hydrophilic polymer includes polymers of which the mechanical strength is capable of suppressing agglomeration of the metal catalyst, and the water absorption property is excellent so that ions are transferred to the catalyst independently of humidification. Suitable polymers include hydrophilic polymer chains, and the polymer may be of any kind as long as it has a structure capable of being crosslinked, and is dissolvable in water or has a swelling rate (absorption percentage of water) of at least 50 wt % (wt % of water included in the polymer), up to a maximum 90 wt %. The wt % of water is obtained by the mathematic formula 1:

$$Wt\ \%\ of\ water = \frac{100 \times weight\ of\ the\ immersed\ water}{weight\ of\ immersed\ water\ +\ weight\ of\ polymer} \quad (1)$$

Suitable hydrophilic polymer chains include those selected from the group consisting of polyether, polyalcohol, polyamide, polysulfonic acid, polycarboxylic acid and cellulose.

The hydrophilic polymers may be polymers having a weight average molecular weight between crosslinking points of 200 to 20,000. A polymer having a weight average molecular weight less than 200 has a brittle property, causing poor stability of the cell, and has a low water-absorption characteristic, causing unsatisfactory hydration of ionomer, when hydrated. A weight average molecular weight more than 20,000 causes excess swelling due to over absorption of water, thereby reducing mechanical strength and causing poor stability of the cell. The weight average molecular weight between the crosslinking points may be determined by estimating the volume change after swelling of a hydrophilic polymer.

Exemplary polymers include: polyether based polymers such as poly(ethylene oxide), poly(propylene oxide), poly(methylene oxide), and copolymers thereof; polymers including a hydroxyl group such as polyvinyl alcohol, a copolymer of polyvinyl acetate and polyvinyl alcohol, poly(hydroxy methyl acrylate), poly(hydroxy ethyl acrylate), and poly(hydroxy ethyl methacrylate); acrylamide-based polymers such as polyacrylamide and polymethacrylamide; cellulose-based polymers such as cellulose, methyl cellulose, and carboxylate methylene cellulose; polycarboxylic acid-based polymers such as polyacrylic acid and polymethacrylic acid; and polysulfonic acid based polymers such as polystyrene sulfonic acid or polyacrylamidopropylsulfonic acid.

Since these polymers all have excellent water absorption properties but are not soluble in water due to their crosslinked structure, they may be formed into a gel-type polymer layer. The layer suppresses coagulation of the metal catalyst particles by steric hindrance.

Moreover, the polymer layer includes water even at room temperature due to its water absorption properties, it decreases resistance at the beginning of drying, it absorbs the water produced at the cathode, and it transfers water into a polymer membrane to improve the performance without humidification.

According to one embodiment of the present invention, the preferred weight ratio of the metal catalyst and the hydrophilic polymer is in the range of 1:5 to 10:1, and more preferably from 2:1 to 5:1. Where the ratio of the metal catalyst to the hydrophilic polymer is greater than 10:1, the polymer does not cover the entire surface of the catalyst, and therefore, the fixing effect is insufficient. where the ratio is less than 1:5, the polymer layer on the catalyst surface is too thick, reducing the transfer of gases and protons.

A method of producing electrodes including a hydrophilic polymer according to an embodiment of the present invention will be illustrated. A polymer precursor is provided and a catalyst and a solvent are mixed to prepare a catalyst composition. Suitable polymer precursors include polyethyleneoxide-diacrylate, polyethyleneoxide-dimetacrylate, polyethyleneoxide-triacrylate, polyethyleneoxide-trimetacrylate, diepoxy polyethylene oxide, polyethylene oxide-diisocyanate, polyvinyl alcohol, polyacrylic acid, and polyacrylamidopropylsulfonic acid.

The catalyst acts to catalytically promote the oxidation-reduction reactions within the fuel cell, and is generally a metal catalyst. Examples include platinum, or a binary to quaternary alloy including platinum and one or more transition metals. Suitable transition metals include ruthenium, chromium, copper, or nickel. It is preferable to use a supported catalyst whereby the catalyst is supported on a carrier. Carbon, such as an acetylene black or graphite, may be used as the carrier, or an inorganic particulate such as alumina or silica may also be used. According to one embodiment, a carbon carrier is preferred.

Suitable solvents include water, alcohols such as isopropyl alcohol, N-methylpyrrolidone, dimethylacetamide, dimethylsulfoxide, tetrahydrofuran, acetone, and mixtures thereof. A binder comprising a fluoride-based resin such as perfluorosulfonate (Nafion™) or polytetrafluoroethylene may also be added to the catalyst composition.

Furthermore, compositions such as azobisisobutyronitrile (AlBN), benzene peroxide, lauroyl peroxide, benzoin ether, benzophenone, benzoamine, acetophenone, thioxanthone, lewis acid diazonium, lewis acid sulfonium, or lewis acid iodinum may be added to the catalyst composition to promote crosslinking reactions.

After the catalyst composition is coated to form a gas diffusion layer, the resulting material is subjected to heat or UV irradiation to crosslink the polymer precursor. The gas diffusion layer supports the electrode of the fuel cell and diffuses reaction gas into the catalyst layer, thereby introducing the reaction gas to the catalyst layer easily. Carbon paper or carbon cloth may be used as the gas diffusion layer. However, it is understood that the present invention is not limited to these.

Figure 3:
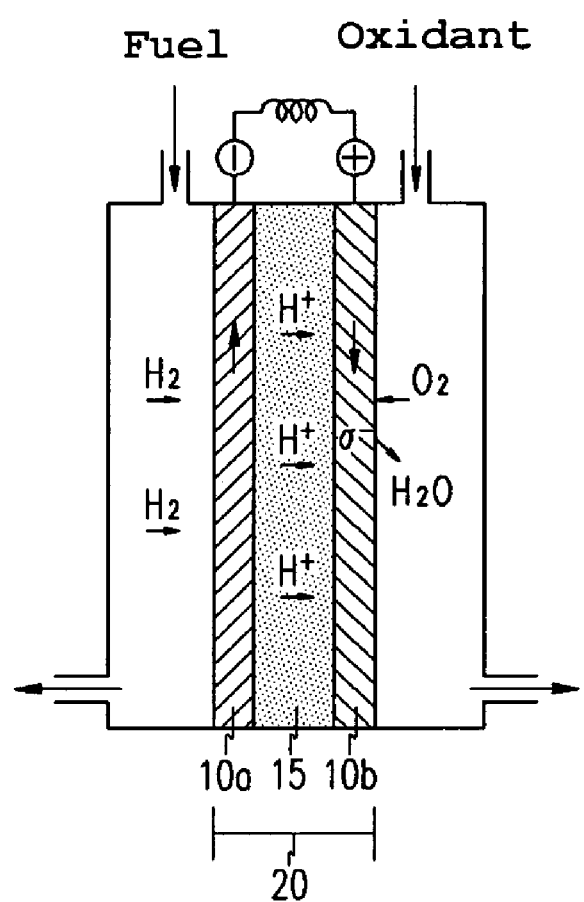
FIG. 3 is a schematic view illustrating an operating state of a fuel cell including a membrane-electrode assembly according to the present invention.

A membrane-electrode assembly according to the present invention includes the catalyst layers formed on the gas diffusion layer as a cathode and an anode, and a polymer membrane positioned between the two electrodes. FIG. 3 schematically shows the operating state of a fuel cell including the membrane-electrode assembly according to the present invention. FIG. 3 is a schematic view of a fuel cell with a membrane-electrode assembly (MEA) 20 including a cathode 10a, and an anode 10b arranged on either side of a polymer membrane 15. The cathode 10a and the anode 10b include catalyst layers in which a metal catalyst for promoting the electrochemical reaction is supported by carbon. A fuel such as hydrogen is supplied to the anode 10b and an oxidant such as oxygen or air is supplied to the cathode 10a in the fuel cell to generate electricity by the electrochemical reaction at the electrodes. In other words, an oxidation of the fuel occurs at the anode 10b, and a reduction of the oxidant occurs at the cathode 10a. Thereafter, a potential difference is generated between the electrodes.

The polymer membrane 15 includes a proton-conductive polymer, that is, an ionomer, and generally, a copolymer of tetrafluoroethylene and fluorovinylether including the sulfonic acid group, defluorinated polyetherketone sulfide, aryl ketone, polybenzimidazole or perflourosulfonate (Nafion™) may be used, but the membrane is not limited thereto. The polymer electrolyte membrane is commonly 10 to 200 μm thick.

The membrane-electrode assembly 20 is inserted into a separator (generally called a bipolar plate), in which a gas flow channel and a cooling channel are formed, to produce a unit cell. Thereafter, a stack, prepared by stacking the unit cells, is inserted between two end plates to produce a fuel cell. A fuel cell can be easily produced by common technology in the related art.

The following examples illustrate the present invention in further detail. However, it is understood that the present invention is not limited by these examples.

Example 1

1 g of polyethyleneoxide diacrylate polymer precursor, 3 g of platinum catalyst supported on carbon (weight % of platinum on the catalyst is 20 wt %), 1 g of a Nafion™ binder, 10 g of an isopropyl alcohol solvent, and 10 mg of benzophenone were mixed together to prepare a catalyst slurry. The catalyst slurry was coated onto carbon paper and irradiated with UV light to crosslink the polymer precursor, thereby obtaining a polymer having a weight average molecular weight between crosslinking points of 5,000. As a result, an electrode was produced. The electrode was used for both a cathode and an anode.

A Nafion™ 112 polymer membrane was placed between the cathode and the anode, and then hot rolled to produce a membrane-electrode assembly.

The membrane-electrode assembly was inserted between two sheets of gasket, and then inserted between two separators in which a gas flow channel and a cooling channel of predetermined shape were formed. Thereafter, this construction was compressed within two copper end plates to produce a unit cell.

Comparative Example 1

A unit cell was produced by the same procedure as in Example 1, except that the polyethyleneoxide diacrylate polymer precursor was not used and UV radiation was not performed.

Availability of the unit cells produced according to Example 1 and Comparative Example 1 were estimated, while fully humidified oxygen and hydrogen were supplied respectively to the anode and the cathode at 60° C. At the beginning stage, according to Example 1 and Comparative Example 1, the current densities are respectively 1.1 A/cm$^2$ and 1.2 A/cm$^2$ at 0.6V. After operating for 500 hours, the current density according to Example 1 was 92% of the initial value, while that according to Comparative Example 1 was 75% of the initial value.

As illustrated above, when a hydrophilic polymer layer capable of preventing coagulation of catalyst particles is formed on a catalyst in a membrane-electrode assembly, deterioration of the lifetime characteristics of a fuel cell according is reduced.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A membrane-electrode assembly for a fuel cell comprising an anode, a cathode, and a polymer membrane between the anode and the cathode, wherein at least one of the anode and the cathode comprises:
   a catalyst layer comprising a catalyst metal; and
   a hydrophilic polymer layer on the catalyst layer comprising a polymer selected from the group consisting of:
      a cross-linked polymer including a hydroxyl group comprising poly(hydroxy methyl acrylate);
      a cross-linked hydrophilic polymer chain comprising cellulose; and
      combinations thereof.

2. The membrane-electrode assembly according to claim 1, wherein the polymer layer includes polymers with a weight average molecular weight between crosslinking points between 200 and 20,000.

3. The membrane-electrode assembly according to claim 1, wherein the polymer is selected from the group consisting of: polymers including a hydroxyl group comprising of poly(hydroxy methyl acrylate); cellulose polymers selected from the group consisting of cellulose, methyl cellulose, and carboxylate methylene cellulose; and combinations thereof.

4. The membrane-electrode assembly according to claim 1, wherein the metal catalyst and the hydrophilic polymer are provided in a weight ratio from 1:5 to 10:1.

5. The membrane-electrode assembly according to claim 4, wherein the weight ratio of the metal catalyst to the hydrophilic polymer is from 2:1 to 5:1.

6. The membrane-electrode assembly according to claim 1, wherein the metal catalyst comprises platinum or a binary to quaternary alloy comprising platinum and a transition metal.

7. The membrane-electrode assembly according to claim 6, wherein the transition metal is selected from the group consisting of ruthenium, chromium, copper, nickel, and combinations thereof.

8. A fuel cell comprising:
   an anode;
   a cathode;
   a polymer electrolyte membrane between the anode and the cathode; and
   a separator having a flow channel thereon for supplying a gas and contacting with either of the anode or the cathode, wherein at least one of the anode and the cathode comprises a catalyst layer comprising a catalyst metal; and a hydrophilic polymer layer on the catalyst metal;
      wherein the hydrophilic polymer layer comprises a polymer selected from the group consisting of:
         a cross-linked polymer including a hydroxyl group comprising poly(hydroxy methyl acrylate);
         a cross-linked hydrophilic polymer chain comprising cellulose; and
         combinations thereof.

9. The fuel cell according to claim 8, wherein the polymer layer includes polymers with a weight average molecular weight between crosslinking points between 200 and 20,000.

10. The fuel cell according to claim 8, wherein the polymer is selected from the group consisting of polymers including a hydroxyl group comprising poly(hydroxy methyl acrylate); cellulose polymers selected from the group consisting of cellulose, methyl cellulose, and carboxylate methylene cellulose; and combinations thereof.

11. The fuel cell according to claim 8, wherein the metal catalyst and the hydrophilic polymer are provided in a weight ratio from 1:5 to 10:1.

12. The fuel cell according to claim 11, wherein the weight ratio of the metal catalyst to the hydrophilic polymer is from 2:1 to 5:1.

13. The fuel cell according to claim 8, wherein the metal catalyst comprises platinum or a binary to quaternary alloy comprising platinum and a transition metal.

14. The fuel cell according to claim 13, wherein the transition metal is selected from the group consisting of ruthenium, chromium, copper, nickel, and combinations thereof.

* * * * *